INVENTOR.
CLIFTON F. STUART
BY
Brown, Critchlow, Flick & Peckham
ATTORNEYS

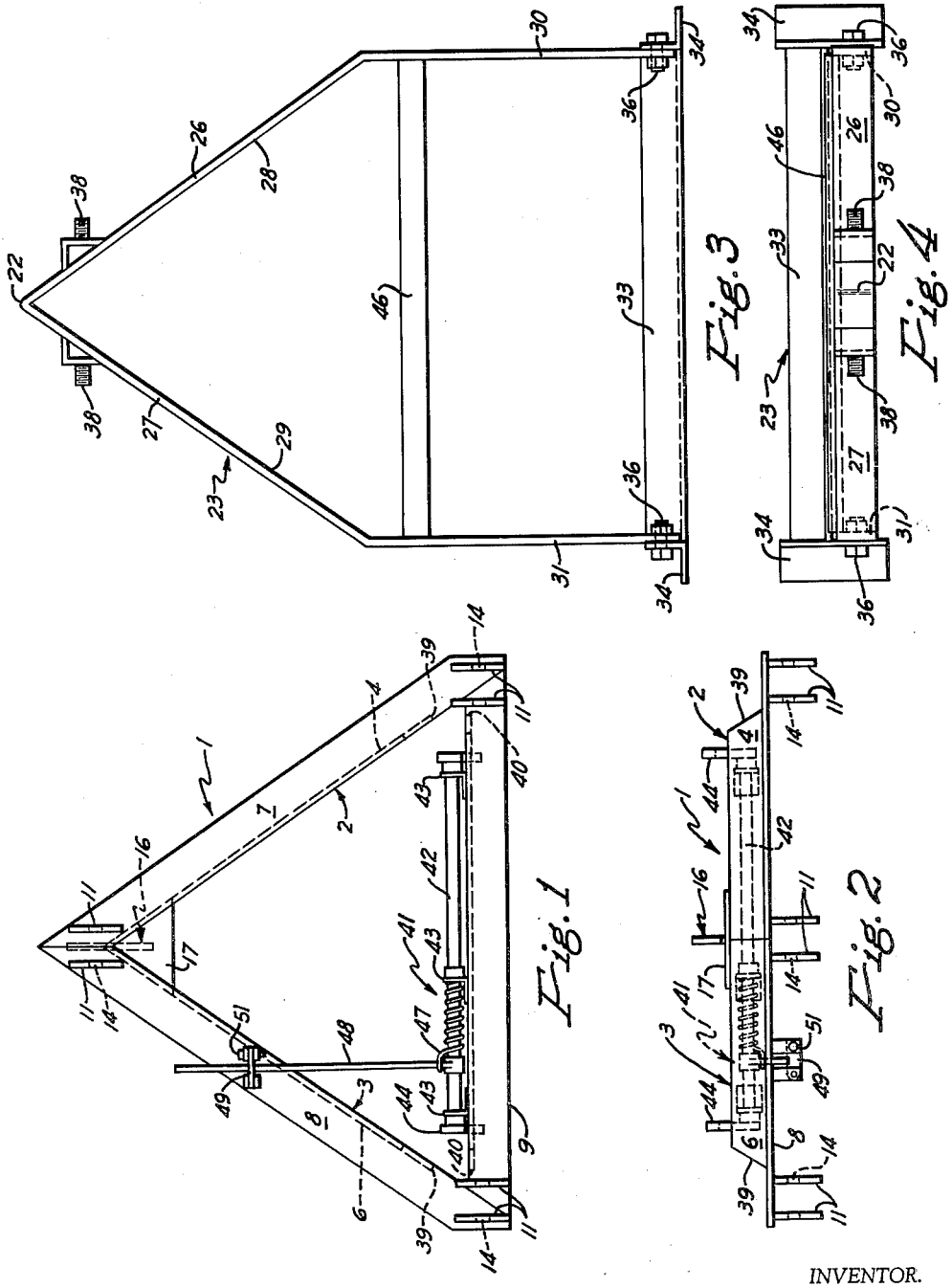

3,029,092
HITCH DEVICE
Clifton F. Stuart, 1101 Woodbine Ave., Warren, Ohio
Filed Jan. 15, 1959, Ser. No. 787,014
8 Claims. (Cl. 280—477)

The present invention relates generally to a hitch for connecting a tractor with an agricultural implement, such as a plow or the like. While not limited thereto, the invention is particularly adapted for use on tractors having a three-point hitch of the type commonly referred to as the Ferguson system.

In the Ferguson system, the tractor has three rearwardly extending links. Two of the links lie substantially in the same horizontal plane; they pull and guide the implement. The third or top link is centrally disposed above the lower links and controls the depth of the implement in the ground. All three links may be actuated hydraulically to raise and lower the implement. Each of the links is provided with a ball and socket outer end to which the implement is attached by pins to provide a three-point hitch.

Hitches of this general type require that the three points of connection between the ends of the links and the mating points on the implement be aligned before the hook-up can be completed. While obtaining such alignment is not unduly difficult when the tractor and implement are both resting on smooth, flat ground, it is often very troublesome to obtain proper alignment of all three points when the tractor and equipment are resting on irregular ground, as they frequently do. In such cases, the tractor or the implement, or both, must be manipulated into proper position through a series of time losing, try and fit maneuvers. In all cases, however, the operator must dismount from the tractor to hitch and unhitch the equipment.

It is among the objects of this invention to provide a hitch device that is generally adaptable for use on various types of tractors, and specifically on those types provided with a three-point hitch, in which the hookup between the tractor and the implement is greatly simplified and can be completed without dismounting from the tractor and with a minimum of manipulation and maneuver. It is another object of this invention to provide such a hitch device that can be simply and cheaply manufactured and that can be easily adapted to and mounted upon most types of tractors and implements now in use.

Other advantages will be apparent from the following description of a preferred embodiment of this invention in connection with the attached drawings, in which FIG. 1 is a front elevation of the male frame member of the type adapted to be secured to a tractor having a three-point hitch;

FIG. 2 is a plan view of the frame of FIG. 1;

FIG. 3 is a front elevation of the female frame member adapted to be secured to an agricultural implement;

FIG. 4 is a plan view of the frame of FIG. 3; and

Figure 5:
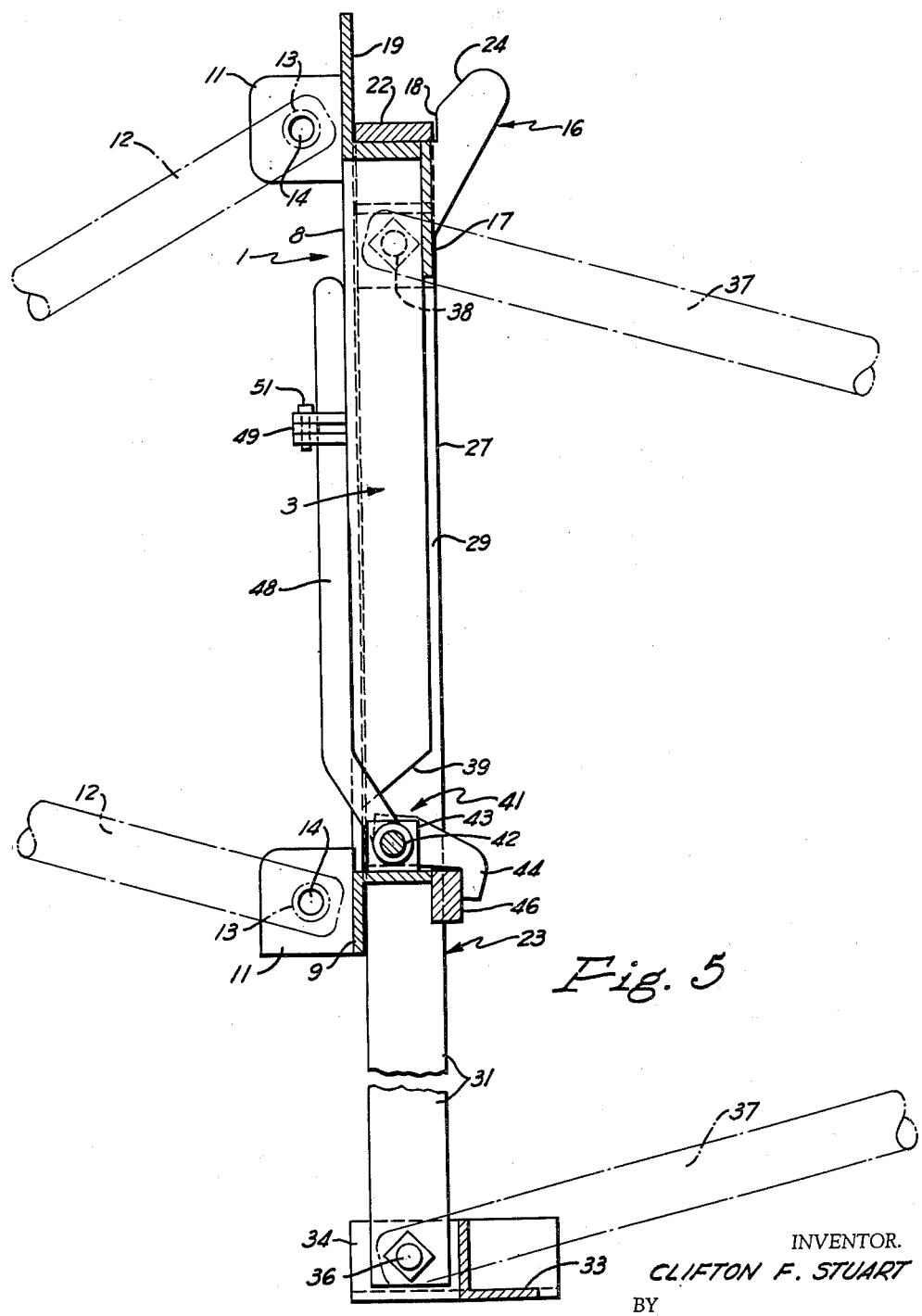
FIG. 5 is a side sectional elevation, showing the male and female frame members of FIGS. 1 and 3, respectively, in their hooked-up positions.

In accordance with this invention, the hitch device includes a male frame member that is adapted to be connected to the tractor and when connected thereto is disposed generally in a substantially vertical plane. The male member has two opposed upwardly converging side portions, each of which has an outer bearing surface. A female frame member is adapted to be connected to the implement and is generally disposed in a substantially vertical plane when so connected. Like the male member, the female member has two opposed upwardly converging side portions substantially conforming to the convergence of the similar elements of the male member, and each of the converging side portions of the female member has an inner bearing surface that is adapted to receive and overlap the corresponding outer bearing surface of the male member. Hookup between the two members is effected by lowering the top of the male member relative to the female member (either by lowering the entire male member or by tilting it backwards), backing the tractor to insert the converging sides of the male member between the corresponding sides of the female member, and then raising the top of the male member (either by lifting that member in its entirety or by returning it from its tilted to its vertical position), so that the bearing surfaces of the two members are brought into engagement, thereby centering the male member inside the female member. Means are provided for securing the two members together with their bearing surfaces in overlapping engagement.

Referring to the drawings, the male member, generally designated by the numeral 1, includes two upwardly converging side portions 2 and 3 having outer bearing surfaces 4 and 6, respectively. These side portions may be conveniently be formed of one leg of each of two angle members, as shown in the drawings, the other legs of these members forming front surfaces 7 and 8. These angle members may be welded, together with a third angle member as a base 9, to form a rigid triangular frame. Other forms, however, are equally satisfactory, including a flat plate on the back of which are welded the converging side portions 2 and 3. The latter are the important elements of the male member and may obviously be mounted in converging relation to each other in a variety of ways.

The front of the male member is provided at each corner with a pair of spaced ears 11 for receiving the ends of the links 12 of a three-point hitch on the tractor, which are secured thereto by pins 13 held in holes 14 in the ears (see FIG. 5). The shape, position, and form of these ears may be altered for suitable attachment to other types of tractors and tractor hitch linkages. In general, the means of securing the male member to the tractor will be the same means, or their equivalents, used on the implements that are normally secured directly to such tractors; and there is no need to specify here the variety of forms of such attaching means.

The male member 1 is also provided at its top with a hook 16 that may be rigidly fastened to the male member, as by welding it to a gusset plate 17 on the back of that member. Hook 16 extends rearwardly and upwardly, preferably having a substantially straight vertical edge 18, which, in cooperation with the vertical surface 19 of the angle members at their apex, forms a notch for receiving the top 22 of the female member 23, presently to be described. Hook 16 also has a rearwardly inclined edge 24 above the vertical edge 18 to facilitate seating of the female member. This inclined edge can be as long as is desirable. For use with a three-point hitch, which enables the male member to be raised in a substantially vertical plane, the proportions shown in the drawing are adequate. For use with tractors having a fixed transverse drawbar, permitting the male member to be tilted backwards on the drawbar but not raised, it is generally desirable that the inclined portion of the hook be somewhat longer.

The female frame member, generally designated by the numeral 23, includes two upwardly converging side portions 26 and 27, having the same or substantially the same angle of convergence as the corresponding side portions 2 and 3 of the male member 1; and their inner lower surfaces form bearing surfaces 28 and 29, which are adapted to overlap and engage the corresponding bearing surfaces 4 and 6 of the male member. The female side portions 26 and 27, and the adjacent leg portions 30 and 31 beneath them, are preferably made of a single heavy metal strap or bar, bent to the indicated form. A base 33, which may be in the form of an angle member, is welded to the lower ends of the legs and may be additionally secured thereto by short side angle members 34 welded to the base and bolted to the legs 31 and 32 by bolts 36. These bolts can also be used to secure the female member to the bottom links 37 of a piece of agricultural equipment, the top links 37 being received on studs 38 mounted on the outer surface of the side portions 26 and 27 near their apex.

It will be noted that the converging side portions 2 and 3 of the male member 1 extend downward only so far that the horizontal distance between their bottom edges 39 is less than the distance between leg portions 30 and 31 of the female member to permit of their entry between those leg portions. For the same reason, the rearwardly extending leg of the base angle 9 is of such length that its ends 40 will also fit between the leg portions of the female member. If desirable, the lower corners of the male member may be reinforced by gusset plates (not shown) welded to those corners under the ears 11.

FIG. 5 shows the male and female members in their engaged draft or work positions. The male member being permanently attached to a tractor (not shown) and the female member to an agricultural implement (also not shown). The operation of hooking up the tractor and implement is as follows. The male member is lowered by the tractor linkage (or tilted backwards) until the top of its hook 16 is below the top of the female member on the piece of equipment to be hooked up. The tractor is then backed towards the equipment until the hook passes under the top of the female member and extends on the other side thereof. The power actuated linkage on the tractor is then operated to raise the male member (or tilt it forward to an upright position). If the tractor and implement are on level ground oppositely centered relative to each other, the two members will directly engage into the nesting position shown in FIG. 5. If they are on irregular ground or not centered, one or the other of the converging side portions of the female member will be engaged by the hook 16, which, as it rises, will bring the tractor and equipment into properly centered alignment, so that the two members will likewise assume the position shown in FIG. 5.

To secure the two members in their engaging draft position, locking means 41 are provided, which in cooperation with hook 16 releasably hold the members together in a rigid unitary combination. The locking means may take a variety of forms, but one of the simplest and one easily operated without dismounting from the tractor is shown in FIGS. 1 and 5. A rotatable rod 42 is mounted on the base of the male member in bearing supports 43. Locking dogs 44 are secured to the ends of the rod and are rotatable with it into locking engagement with a transverse locking bar 46 welded on the back of the leg portions of the female member. A torsion spring 47 fits over the rod 42 and has one end secured to a bearing support 43 and the other end to an operating lever 48, which is in turn secured to rod 42. The spring urges the bar 42 and dogs 44 into locking position, where they are releasably held by a gate 49 and pin 51, which maintain the operating lever upright against the front of the male member 1.

It will be obvious that the apparatus just described can be modified in a variety of ways consistent with this invention. For example, the male and female members may have truncated top portions, instead of the apices shown in the drawings. Also, the hook 16 may be replaced by a vertical pin on the top of the male member, the pin engaging a hole or slot in the top of the female member, and performing the same function as the hook.

As a further alternative, the equivalent of hook 16 may be supplied by a depending pin or lug on the female member that will engage the front of the male member at the top (or through a hole in the top) when the male member is lifted into mating position under the female member. Furthermore, it will be understood that the converging side portions of the two members, instead of being straight, may converge upwardly in an arch or other curve; and instead of being flat across their width, the bearing surfaces may be curved across that dimension.

It is among the advantages of this invention that it has the simplicity and operative convenience of a one-point hitch (i.e. the hooking together of the top of the male and female members) that is easily engaged and from the engagement of which two additional hitch points are automatically aligned and can then be locked together (by the locking means operated by lever 48) to provide a three-point hitch. The hookup can be effected by the operator quickly and easily without dismounting from the tractor. Separate female adapter members 28 may be secured to as many pieces of equipment as desirable and the tractor can be quickly hooked and unhooked from each.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A hitch for connecting a tractor to an agricultural implement comprising a male member adapted to be connected to the tractor and to be raised and lowered thereby in a substantially vertical plane, the male member having a top and two opposed upwardly converging side portions below the top, each side portion having an outwardly facing aligning surface and a generally vertical front face that projects laterally outward beyond the aligning surface, a female member adapted to be connected to the implement and generally disposed in a substantially vertical plane, the female member having a top and two opposed upwardly converging side portions below its top, each of the side portions conforming to the convergence of the side portions of the male member and each having an inwardly facing aligning surface adapted to receive and overlap the corresponding aligning surface of the male member, and projecting means secured to the back of the male member adjacent its top and adapted to pass through the female member when the male member is inserted in the female member and thereafter when the male member is raised relative to the female member to guide the female member into nesting relation with the male member with the aligning surfaces of the two members in lapping engagement and with the female member confined between said projecting means and the front face of the male member.

2. Apparatus in accordance with claim 1 that also includes releasable locking means secured to one of the members adjacent the lower ends of its side portions for locking the two members together in nested relation.

3. A hitch device for connecting an implement to a tractor having power-operated means for lifting and lowering a member attached thereto or for tilting such a member in a fore and aft direction, said device comprising a first frame connected to the power operated means and a second frame connected to the implement, the first frame including a top having a rearwardly extending seat and hook means extending rearwardly and upwardly behind the seat and laterally spaced rearwardly extending aligning means below the seat, the second frame including a top and downwardly diverging side portions, both frames when interconnected being disposed in substantially vertical planes transverse to the longitudinal center line of the tractor and implement combination with the top of the second frame positioned on the seat of the first frame in front of the hook means and with the aligning means of the first frame received within the side portions of the second frame in lapping engagement therewith, laterally spaced and laterally extending abutments on one of the frames and engageable with the other frame to limit the lapping engagement of the frames, and releasable latch means mounted on one of the frames and in its latched position engaging the other frame below the tops of the frames to prevent fore and aft separation of the bottoms of the frames and in its released position permitting the bottoms of the frames to be separated in a fore and aft direction without fully disengaging the top of the second frame from the seat on the first frame.

4. Apparatus according to claim 3, in which the hook means on the first frame has a vertical edge portion extending upwardly from the seat and an inclined edge portion extending upwardly and rearwardly from the vertical edge portion.

5. Apparatus according to claim 3, in which the aligning means on the first frame comprises downwardly diverging side portions conforming to and receivable within the diverging side portions of the second frame.

6. A hitch for connecting an implement to a tractor having power-operated means for lifting and tilting, the hitch comprising a male frame member adapted to be connected to the power-operated means on the tractor and having two opposed side portions converging upwardly towards each other and adapted to lie generally in a plane that is substantially normal to the longitudinal axis of the tractor and implement combination, each of said side portions having an outwardly facing aligning surface, a female frame member adapted to be connected to the implement and generally disposed in a substantially vertical plane, the female member having two opposed upwardly converging side portions conforming to the convergence of the side portions of the male member, each of the side portions of the female member having an inwardly facing aligning surface adapted to receive and overlap the corresponding aligning surfaces of the male member, and a hook mounted on the rear of the male member adjacent its top, the hook having a substantially vertical edge portion and an upwardly and backwardly inclined edge portion above the vertical edge portion for engaging the back of the female member and guiding the female member into overlapping engagement with the male member.

7. A hitch for connecting a tractor or the like to an agricultural implement or the like, comprising a male member adapted to be connected to the tractor and to be raised and lowered thereby or tilted thereby in a fore and aft direction from a substantially vertical plane, the male member having a top and two opposed upwardly converging side portions below the top, each side portion having an outwardly facing aligning surface and a generally vertical face that projects laterally outward beyond the aligning surface on that side of the male member nearest the tractor, a female member adapted to be connected to the implement and generally disposed in a substantially vertical plane, the female member having a top and two opposed upwardly converging side portions below its top, each of the side portions conforming to the convergence of the side portions of the male member and each having an inwardly facing aligning surface adapted to receive and overlap the corresponding aligning surface of the male member, and projecting means secured to the male member adjacent its top and on the side of the male member remote from the tractor, said means being adapted to pass through the female member when the male member is inserted in the female member and thereafter when the male member is raised or tilted backwards relative to the female member to guide the female member into nesting relation with the male member with the aligning surfaces of the two members in lapping engagement and with the female member confined between said projecting means and the vertical face of the male member.

8. A hitch device for connecting an implement to a tractor or other vehicle having power-operated means for lifting and lowering or for tilting in a fore and aft direction a member attached thereto, said device comprising a first frame attachable to the implement and a second frame attachable to the power-operated means, both frames when so attached being adapted to be connected together with the first frame overlapping the second frame and when so connected being normally disposed in generally vertical planes transverse to the longitudinal center line of the tractor implement combination, the first frame having sides that converge upwardly to a top, the second frame having a seat extending in a fore and aft direction adjacent its top for receiving the top of the first frame, the top of each frame having a proximate edge that is adjacent the other frame when the frames are slightly separated in a fore and aft direction and an opposite remote edge, projecting means rigidly mounted on one of the frames adjacent the proximate edge of its top portion and adapted to engage the remote edge of the top portion of the other frame, as when the top of the second frame is tilted towards the first frame and inserted between its converging sides and then raised, to guide the top of the first frame into engagement with the seat on the second frame for hingedly supporting the first frame for pivotal movement through a substantial vertical angle relative to the second frame for aligning the two frames in substantially the same plane, the second frame including laterally spaced aligning means below the top of the frame for laterally aligning one frame with the other, said aligning means being engageable in a fore and aft direction with the sides of the first frame while the top of the first frame hingedly engages the seat on the second frame, and releasable latching means mounted on one frame and engageable with the other frame below the tops of the frames, said latching means being operative, while the first frame is positioned on the seat of the second frame, in one position to latch the bottom portions of the frames together against separation in a longitudinal direction and in a second position to release the bottom portions of the frames for separation in such direction.

References Cited in the file of this patent
UNITED STATES PATENTS

| | | |
|---|---|---|
| 644,338 | Slauson | Feb. 27, 1900 |
| 2,685,453 | Kuhary et al. | Aug. 3, 1954 |
| 2,710,569 | Altgelt | June 14, 1955 |
| 2,833,562 | Francois | May 6, 1958 |
| 2,888,995 | Sorensen | June 2, 1959 |
| 2,979,137 | Hess | Apr. 11, 1961 |

FOREIGN PATENTS

| | | |
|---|---|---|
| 29,731 | France | Feb. 17, 1954 |

(2nd addition to No. 1,014,471)